United States Patent [19]
Ito et al.

[11] Patent Number: 5,668,365
[45] Date of Patent: Sep. 16, 1997

[54] CARD UPSIDE-DOWN INSERTION PREVENTATIVE APPARATUS

[75] Inventors: Toshiyasu Ito, Togane; Shigeru Sato, Yotsukaido, both of Japan

[73] Assignee: Yamaichi Electronics Co., Ltd., Tokyo, Japan

[21] Appl. No.: 659,162

[22] Filed: Jun. 5, 1996

[30] Foreign Application Priority Data

Jun. 19, 1995 [JP] Japan .................... 7-176722

[51] Int. Cl.$^6$ .................. G06K 13/04; G06K 13/00; G06K 13/06; G06K 7/00
[52] U.S. Cl. .................. 235/486; 235/479; 235/482; 235/483
[58] Field of Search .................. 235/482, 487, 235/488, 492, 493, 495, 479

[56] References Cited

U.S. PATENT DOCUMENTS

| | | | |
|---|---|---|---|
| 3,245,697 | 4/1966 | Nugent | 235/488 |
| 3,777,120 | 12/1973 | Menger et al. | 235/61.11 R |
| 4,575,703 | 3/1986 | Shishido | 235/482 |
| 4,724,310 | 2/1988 | Shinamura et al. | 235/482 |
| 4,734,567 | 3/1988 | Hansbauer | 235/482 |
| 5,120,946 | 6/1992 | Hus et al. | 235/482 |
| 5,225,653 | 7/1993 | Martin et al. | 235/482 |
| 5,286,957 | 2/1994 | Defrasne | 235/482 |

*Primary Examiner*—Donald T. Hajec
*Assistant Examiner*—Douglas X. Rodriguez
*Attorney, Agent, or Firm*—Wenderoth, Lind & Ponack

[57] ABSTRACT

A card upside-down insertion preventive apparatus comprises a truncated corner portion formed at one end of a leading edge portion of a square card, a card tray disposed in a card insertion chamber communicating with a card inlet port, the card tray having a front abutment member and capable of moving in accordance with insertion of the card, the leading edge of the card being brought into abutment with the front abutment portion when the card is inserted through the card inlet port, a lock claw formed on the card tray, the lock claw being capable of displacing upwardly and downwardly in a direction perpendicular to the card insertion direction, a pressure receiving portion formed on the claw in a region within the truncated corner portion of the card which is in abutment with the front abutment member, the pressure receiving portion causing the lock claw to displace downwardly by being pressed by a non-truncated corner portion formed at the other end of the front edge portion of the card when the card is inserted upside down, and an engagement portion formed at a location corresponding to a lower surface of the card tray and adapted to engage the lock claw when the lock claw has displaced downwardly.

3 Claims, 6 Drawing Sheets

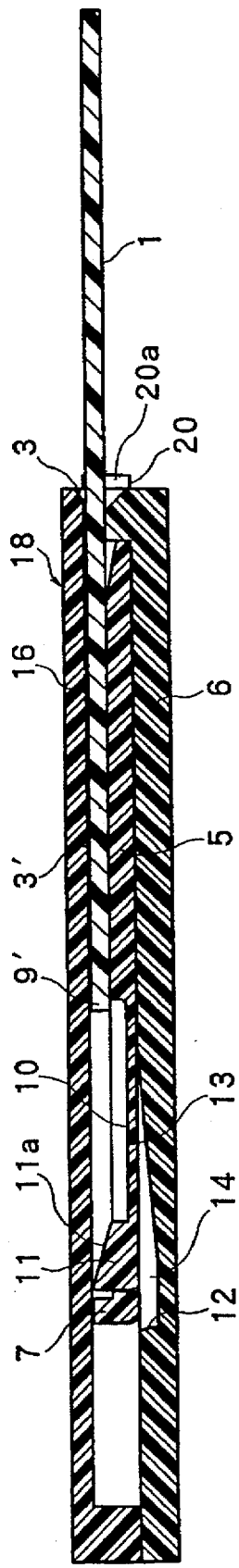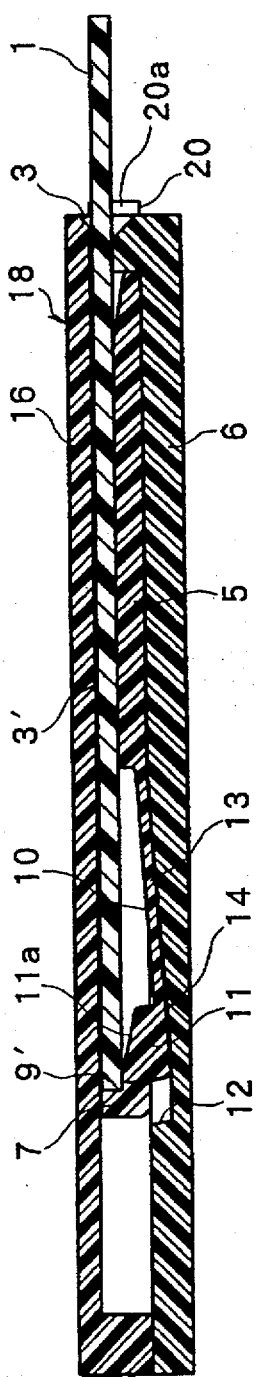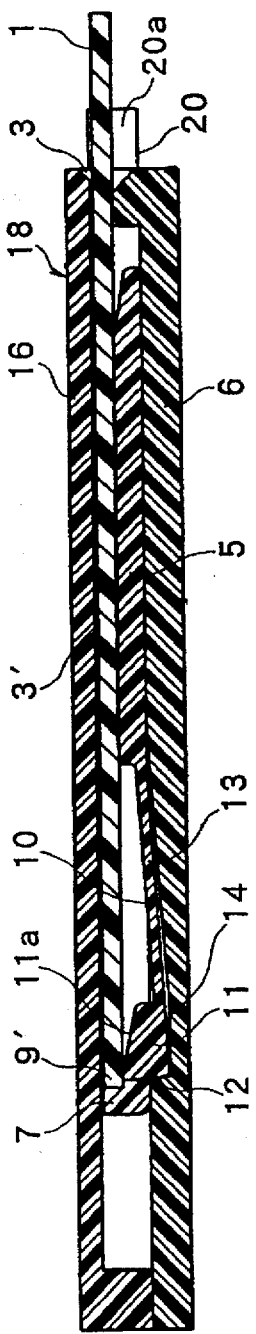

CARD UPSIDE-DOWN INSERTION PREVENTATIVE APPARATUS

BACKGROUND OF THE INVENTION

1. Field of the Invention

This invention relates to a card upside-down insertion preventive apparatus for preventing a card, such as a memory card, a credit card, a cash card or the like, from being inserted in its upside-down state.

2. Description of the Prior Art

There is known a conventional technique for ejecting a card by electrically detecting a detection portion provided on the card when the card happens to be inserted in its upside-down state into a card inlet port, after the completion of insertion. In spite of the ineffective insertion, a signal pad of the card is brought into robbing contact with a contact disposed within the inlet port and therefore, the point of contact is subjected to wear due to repeated incorrect insertion of the card, thereby substantially reducing the effective number of times for insertion of the card.

Also, since the time from the time when the card is inserted in its upside-down state to the time when the card is ejected is long, reliability of detection is not good for both contact and non-contact type of methods for electrically detecting the detection portion of an inserted card.

The present invention has been accomplished in view of the above.

SUMMARY OF THE INVENTION

It is, therefore, an object of the present invention to provide a card upside-down insertion preventive apparatus in which a card can reliably and rapidly be prevented from being inserted in its upside-down state through a mechanical means.

To achieve the above object, there is essentially provided a card upside-down insertion preventive apparatus comprising a truncated corner portion formed at one end of a leading edge portion of a square card, a card tray disposed in a card insertion chamber communicating with a card inlet port, the card tray having a front abutment member and capable of moving in accordance with insertion of the card, the leading edge of the card being brought into abutment with the front abutment portion when the card is inserted through the card inlet port, a lock claw formed on the card tray, the lock claw being capable of displacing upwardly and downwardly in a direction perpendicular to the card insertion direction, a pressure receiving portion formed on the claw in a region within the truncated corner portion of the card which is in abutment with the front abutment member, the pressure receiving portion causing the lock claw to displace downwardly by being pressed by a non-truncated corner portion formed at the other end of the front edge portion of the card when the card is inserted upside down, and an engagement portion formed at a location corresponding to a lower surface of the card tray and adapted to engage the lock claw when the lock claw has displaced downwardly.

The card tray may be means for controlling a contact which is brought into contact with a card during the movement of the card tray in accordance with the insertion of the card.

Preferably, the pressure receiving portion has a pressure receiving surface which is inclined upwardly in the card insertion direction.

With a card upside-down insertion preventive apparatus of this construction, when the card is inserted in its correct state, the card is brought into abutment with the front abutment member of the card tray and in that condition, the pressure receiving portion of the lock claw is located in the region of the truncated corner portion. That is, since the truncated corner portion of the card works such that the abutment between the card and the pressure receiving portion of the lock claw is avoided, the card is inserted into a predetermined place together with the card tray and as a consequence of this insertion, the contact is brought into contact with the pad of the card through the card tray, thereby forming an electrical circuit.

Also, when the card happens to be inserted in its upside-down state, the opposite corner portion to the truncated corner portion of the card moves on the inclined surface (pressure receiving surface) of the pressure receiving portion to depress the pressure receiving portion. As a consequence, the lock claw is caused to displace downwardly to engage the engagement portion formed on the bottom wall (base plate) of the card insertion chamber, so that the card tray is positively prevented from movement. Accordingly, owing to a provision of the front abutment member, the card is positively prevented from being inserted in its upside-down state and a card user can feel the ineffective insertion of the card with the finger so that he or she can immediately withdraw the card from the machine and insert it again in its correct state.

Other objects, features and advantages of the invention will become more clearly apparent from reading of the following specification which has been prepared in conjunction with the accompanying drawings.

BRIEF DESCRIPTION OF THE DRAWINGS

FIGS. 5(A), 5(B) and 5(C) are sectional views of an internal construction of the inlet port including the card tray, showing the state of the lock claw when the card is being inserted in its upside-down state.

DETAILED DESCRIPTION OF THE EMBODIMENT

One embodiment of a card upside-down insertion preventive apparatus according to the present invention will now be described with reference to the accompanying drawings.

Figure 4A:
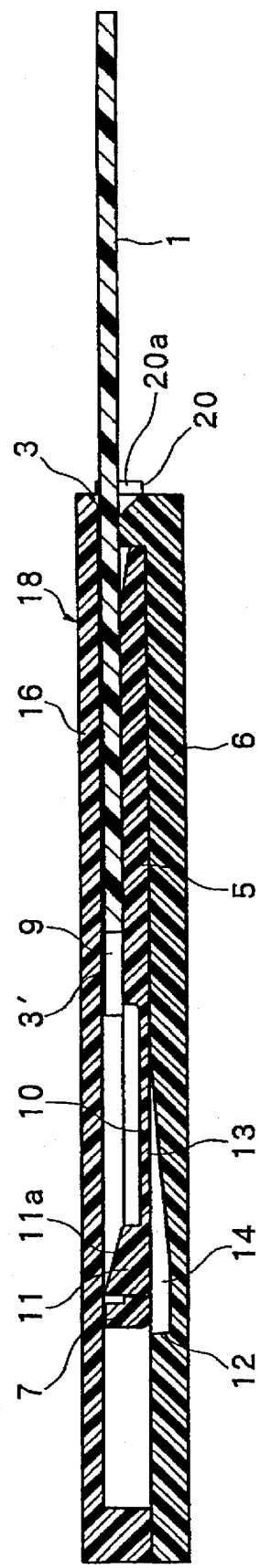
FIGS. 4(A), 4(B) and 4(C) are sectional views of an internal construction of an inlet port including the card tray, showing the state of the lock claw when the card is being inserted in its correct state.
Figure 4B:
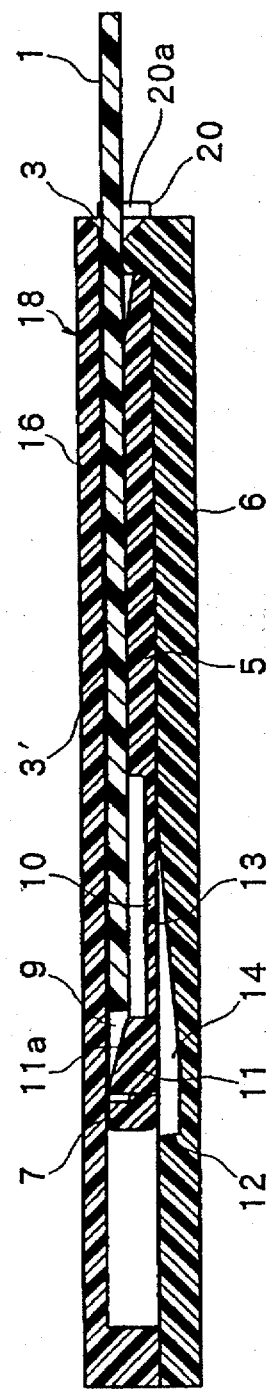
Figure 4C:
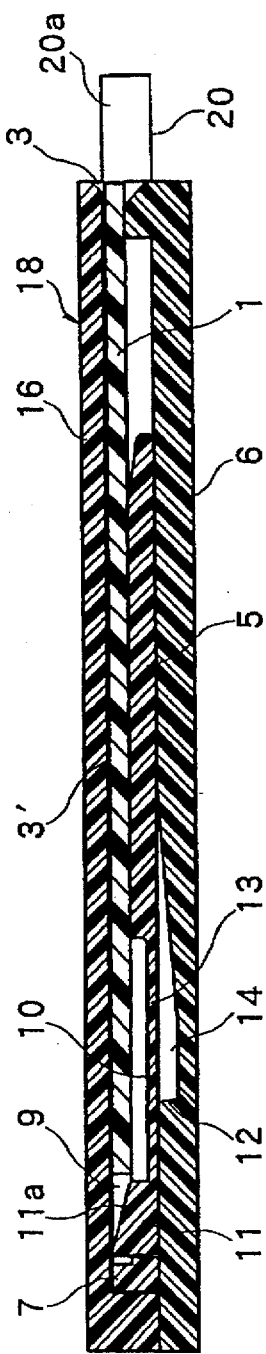
Figure 6:
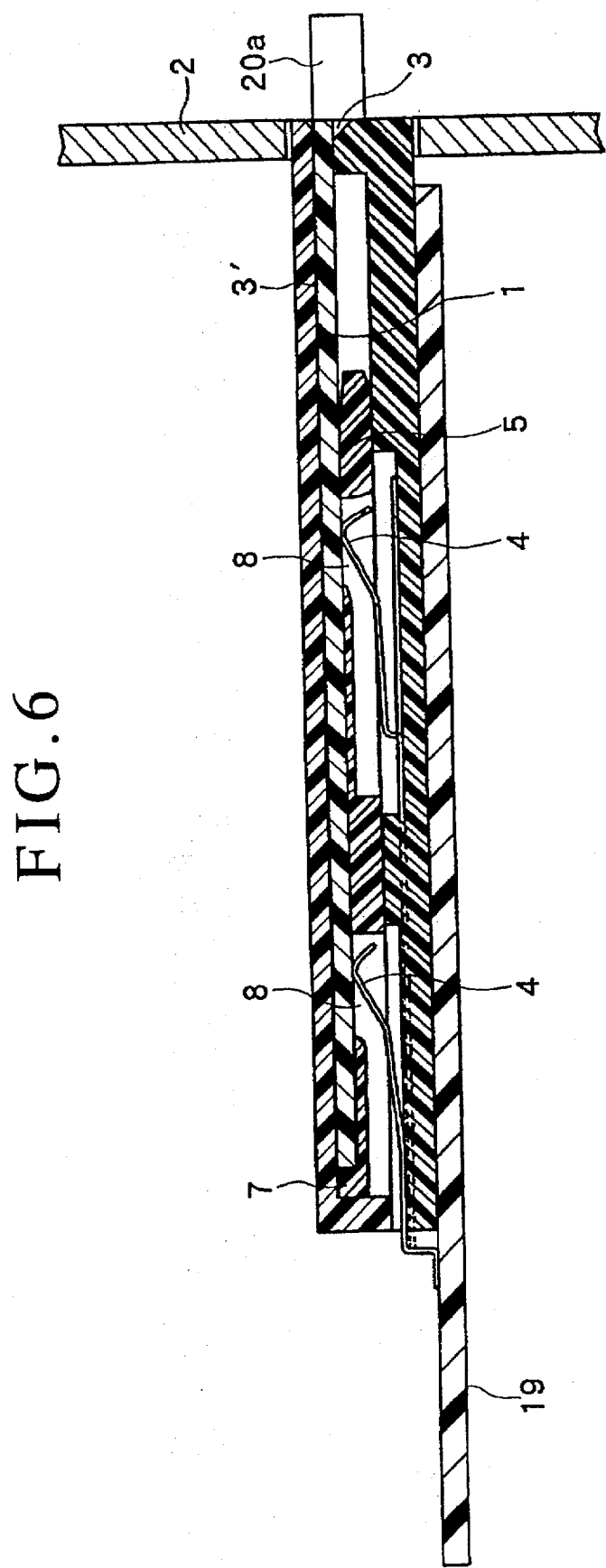
FIG. 6 is a sectional view of the internal construction of the inlet port when the card is inserted in its correct state.

As shown in FIGS. 4 and 6, a card 1, as represented by a memory card, a credit card or the like, is inserted into a card insertion chamber 3' of a machine 2 through an inlet port 3. Then, a pad provided on the card 1 is brought into contact under pressure with a contact 4 provided within the card insertion chamber 3' to form an electrical circuit. A plurality of such contacts 4 are arranged in such a manner as to face an inner bottom surface of the card insertion chamber 3', that is, a lower surface of the card 1 inserted through the inlet port 3, and fixedly connected to a wiring board 19.

Figure 1:
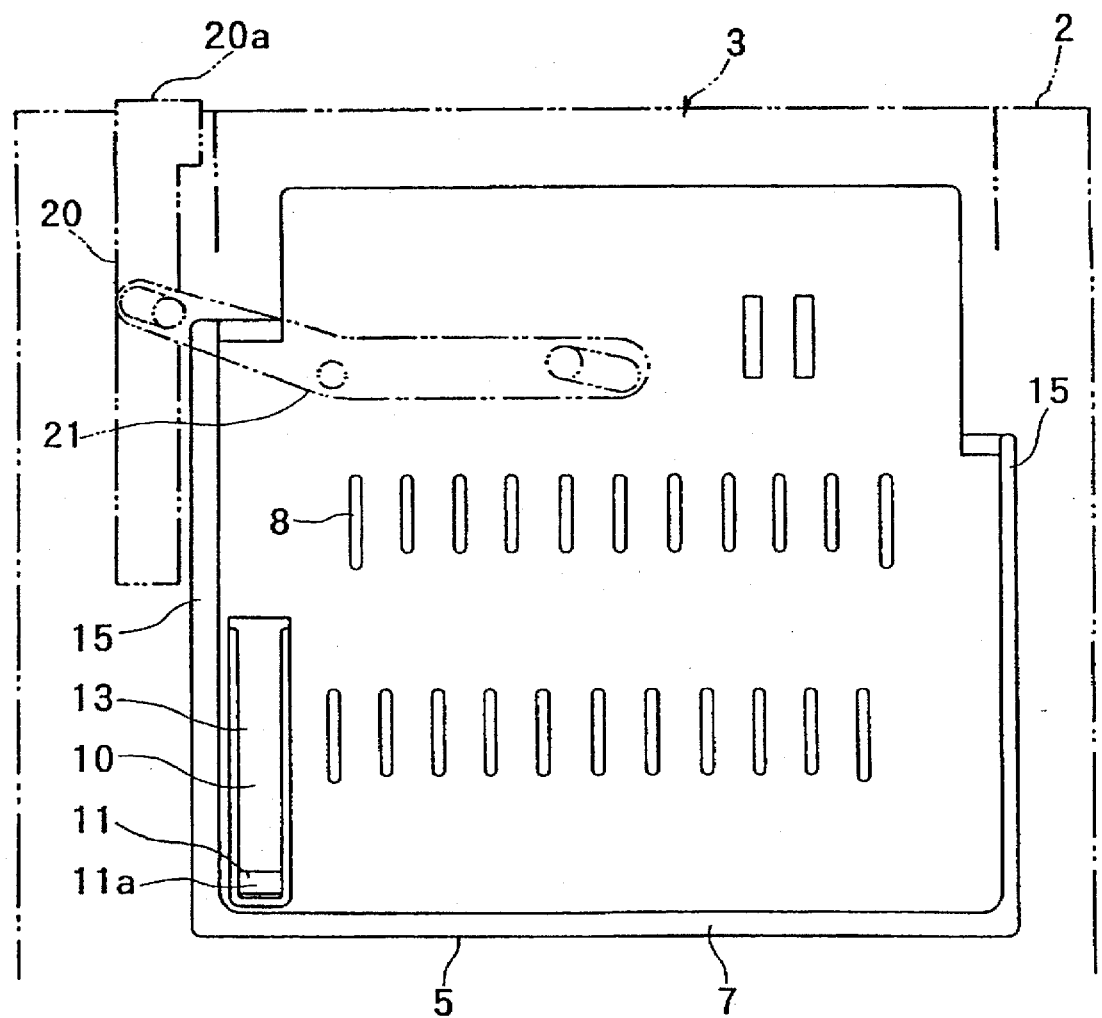
FIG. 1 is a plan view of a card tray of a card upside-down preventive apparatus according to one embodiment of the present invention.

As means for displacing the contacts 4 between a contact position and a non-contact position (i.e., contact-relation canceling position), there is a provision of a card tray 5, as shown in FIG. 1, within the card insertion chamber 3'. This card tray 5 is superimposed on an inner surface of a base plate 6 which forms a bottom wall of the card insertion chamber 3'. The card tray 5 can be slid in the insertion/withdrawal directions (forward/backward directions) of the card 1 guided by the inner surface.

Figure 2:
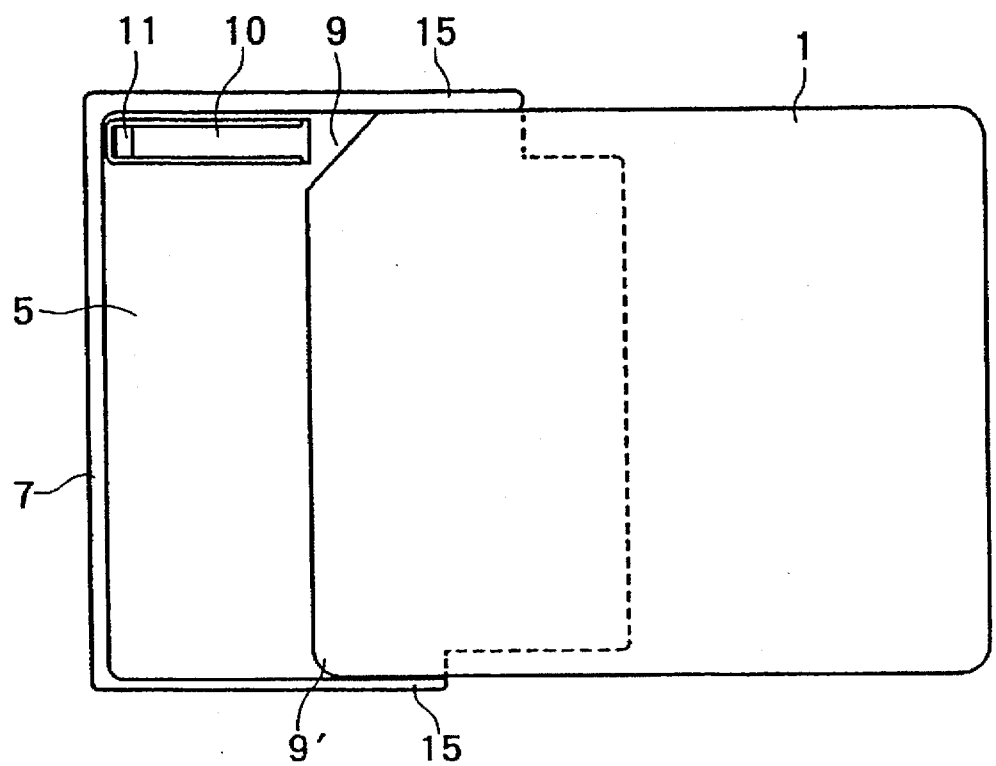
FIGS. 2(A) and 2(B) are plan views of the card tray, showing the state of a lock claw when a card is being inserted in its correct state.
Figure 2:
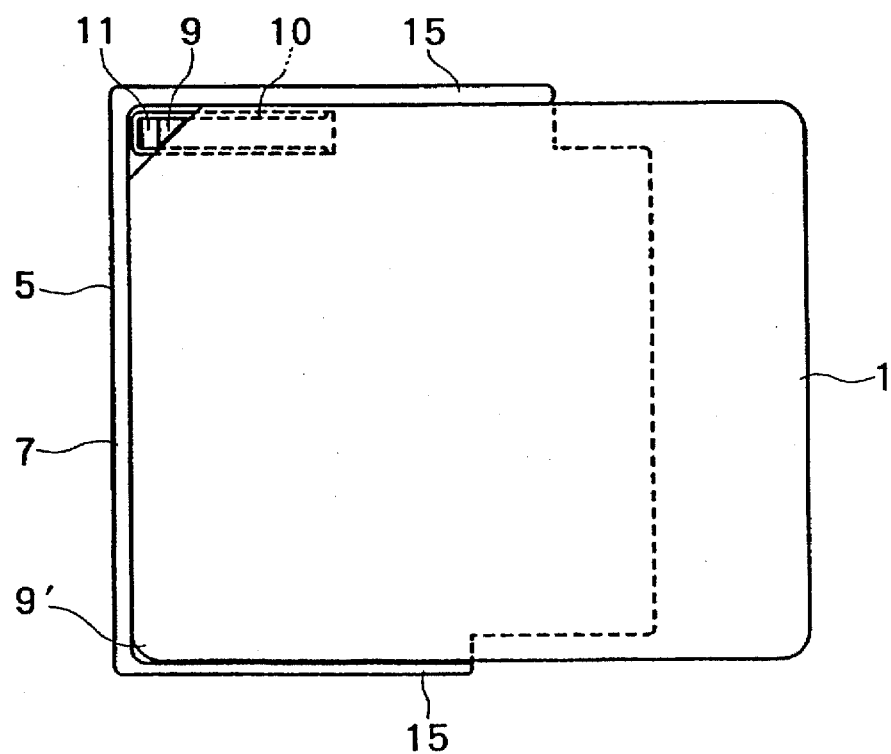

As shown in FIGS. 1, 2 and 4, as well as elsewhere, the card tray 5 is provided at a front edge thereof with a from abutment member 7 with which a leading edge of the card 1 is brought into abutment. Immediately after the start of insertion of the card 1 into the card insertion chamber 3', the card 1 is brought into abutment with the front abutment member 7. If the insertion of the card 1 is continued, the card 1 urges the front abutment member 7 to slide in the card insertion direction in accordance with the insertion direction of the card 1.

As shown in FIG. 6, during the course of sliding movement of this card tray 5, that is, immediately before the completion of insertion of the card, the contacts 4, which can be resiliently displaceable upwardly and downwardly, slides on a lower surface of the card tray 5 respectively into grooves 8 formed in the card tray 5 and electrically contacts under pressure the pad of the card 1 through the grooves 8.

As a card upside-down insertion preventive means, a truncated corner portion 9 is formed on one end of the leading edge portion of the square card 1, whereas the card tray 5 having, as already described, the front abutment member 7 with which the leading edge portion of the card 1 is brought into abutment when the card 1 is inserted through the inlet port 3, is disposed within the card insertion chamber 3' for movement in accordance with the insertion action of the card 1.

And the card tray 5 is provided with a lock claw 10 which can be displaced upwardly and downwardly in a direction perpendicular to the insertion direction of the card 1. The lock claw 10 is provided with a pressure receiving portion 11 arranged within the region of the truncated corner portion 9 of the square card 1 which is in abutment with the front abutment member 7. When the card 1 is inserted in an upside-down state, the pressure receiving portion 11 is pressed by the non-truncated corner portion 9' of the other end of the leading edge of the card 1 to cause the lock claw 10 to be displaced downwardly.

Figure 3:
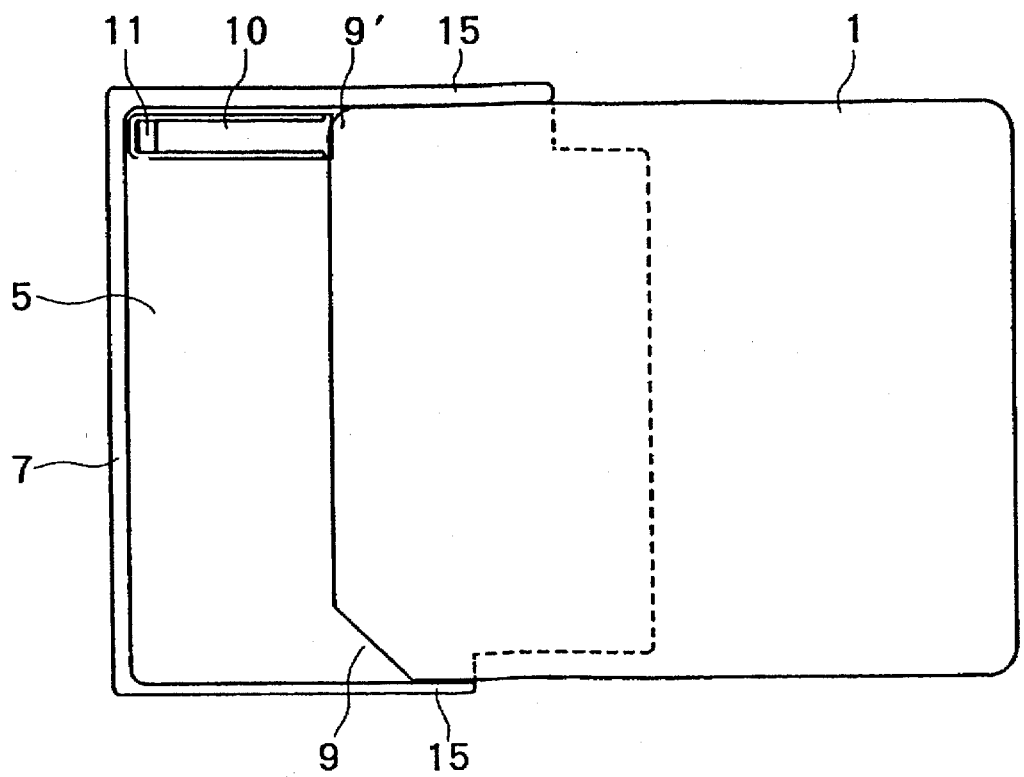
FIGS. 3(A) and 3(B) are plan views of the card tray, showing the state of the lock claw when a card is being inserted in its upside-down state.
Figure 3:
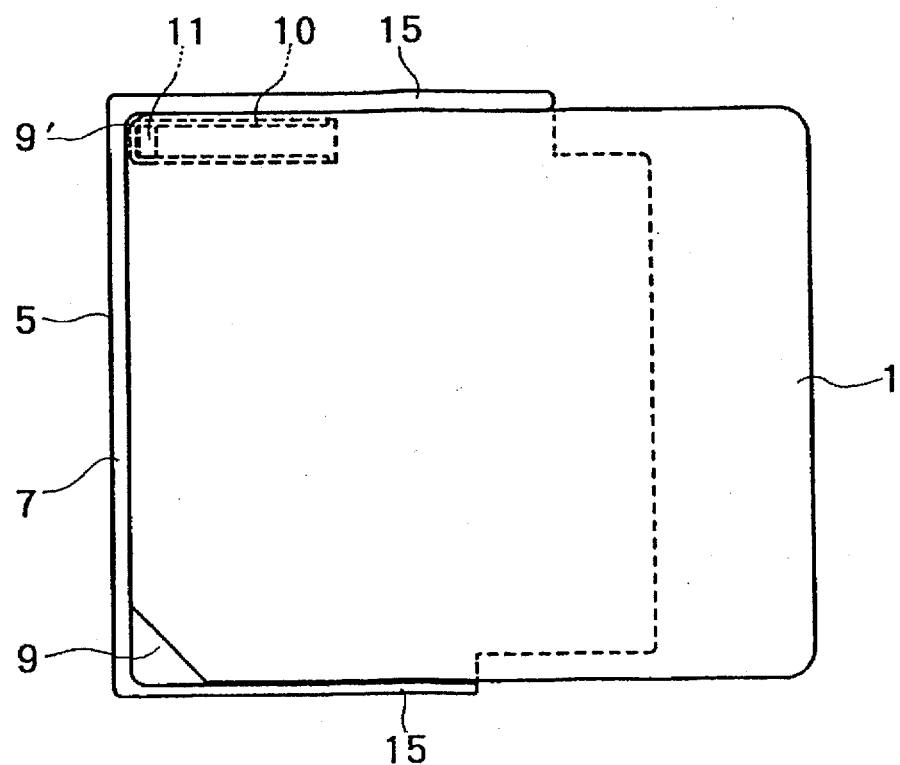

Further, the base plate 6, which supports the lower surface of the card tray 5, is provided with an engagement portion 12. This engagement portion 12 is adapted to engage the downwardly displaced lock claw 10 to prevent the movement of the card tray 5. As shown in FIG. 4, the pressure receiving portion 11 has a pressure receiving surface 11a which is inclined upwardly in the insertion direction (forwardly) of the card 1. As shown in FIGS. 3 and 5, when the card 1 is inserted in an upside-down state, the corner portion of the leading edge of the inserted card 1 is guided by the pressure receiving surface 11a (inclined surface) and presses the lock claw 10 such that the lock claw 10 is displaced downwardly.

The lock claw 10 is disposed within the region of the corner portion of the first-mentioned end of the square card tray 5. The lock claw 10 has an arm portion 13 which extends in the insertion direction of the card 1. The arm portion 13 is connected to the card tray 5 at the end portion on the starting end side of insertion of the card 1. The terminal end side of insertion of the card 1 is a free end. This free end of the arm portion 13 is provided with a projection projecting from the upper surface of the card tray 5. This projection serves to form the pressure receiving portion 11. The pressure receiving portion 11 has the pressure receiving surface 11a.

The lock claw 10 and the card tray 5 are integrally formed of synthetic resin material. In the alternative, the lock claw 10 is constituted of a thin leaf spring and then attached to the lower surface of the card tray 5 such that the pressure receiving portion 11 projects upwardly (within the card insertion chamber 3') of an opening formed in the card tray 5.

As shown in FIG. 5, as well as elsewhere, the base plate 6 is provided with a release portion 14 for accepting the downwardly displaced lock claw 10. A front wall, which defines the release portion 14, serves as the engagement portion 12 of the lock claw 10.

The card tray 5 has the front abutment member 7 formed on its leading edge. In addition, the card tray 5 has a side ruler 15 for regulating the left and right side edges of the card 1. A rear edge of the card tray 5 is opened to communicate with the inlet port 3. An upper surface of the card tray 5 is closed with atop plate 16 which forms a top wall of the card insertion chamber 3'. The base plate 6, the side ruler 15 and the top plate 16 altogether define the card insertion chamber 3'. The card tray 5 is disposed within the card insertion chamber 3' for movement forwardly and backwardly.

In other words, the base plate 6 and the top plate 16 define a flat and square card acceptance housing 18. The inlet port 3 is formed in the front end of the card acceptance housing 18. The card tray 5 is allowed to move within the card insertion chamber 3' which is formed within the housing 18.

As shown in FIG. 4, when the card 1 is inserted in its correct state into the card insertion chamber 3' through the inlet port 3 until the leading edge of the card 1 abuts with the front abutment member 7, the leading edge portion of the card 1 is supported by the upper surface of the card tray 5 and the read edge portion is allowed to project outwardly of the inlet port 3. When the card 1 is further inserted, the front abutment member 7 is pressed by the leading edge of the card 1 to cause the card tray 5 to move forwardly. As a consequence, an electrical connection between the card 1 and the contacts 4 can be achieved. An ejection control lever 20 is linked to the card tray 5 through a lever 21. Accordingly, when the card tray 5 is moved forwardly in accordance with the forward movement of the card 1, a control portion 20a of the ejection control lever 20 is moved in a direction projecting from an opening surface of the inlet port 3. The injection control lever 20 is a lever which is reciprocally movably disposed sidewardly of the card tray 5 and allowed to extend in parallel with the insertion direction of the card 1. Accordingly, the projecting control portion 20a is depressed to move the ejection control lever 20, so that the card tray 5 can be moved in the direction to the insertion direction of the card 1 through the lever 21. By doing this, the front abutment member 7 pushes the card 1 out of the inlet port 3 so that the rear part of the card 1 is exposed.

As mentioned, the card tray 5 is a means for correctly positioning and guiding the card 1 into a correct insertion position and also serves as means for preventing the card 1 from being inserted in its upside-down state. Also, the card tray 5 constitutes an ejection means.

As shown in FIG. 5, when the card 1 is inserted in its upside-down state, the abutment member 7 and the lock claw 10 co-act with each other to prevent further movement of the card 1 and the tray 5 as previously mentioned. Accordingly, the control portion 20a of the ejection control lever 20 is not allowed to project up to the ejection control position. At that time, since the front portion of the card 1 is supported by the card tray 5 and the rear portion is allowed to project from the inlet port 3, the card 1 can immediately be removed by handling this projecting portion and re-inserted in its correct state.

The card, which is inserted in its correct state, is brought into abutment with the front abutment member and in that condition, the pressure receiving portion of the lock claw is located within the region of the truncated corner portion. Accordingly, since the truncated corner portion of the card prohibits the card 1 from being abutted with the pressure receiving portion of the lock claw, the card can be inserted into a predetermined insertion position in its correct state together with the card tray.

In contrast, when the card is inserted in its upside-down state, the truncated corner portion and the other side corner portion of the inserted card move on the inclined surface of the pressure receiving portion and depress the pressure receiving portion. As a consequence, the lock claw is caused to displace downwardly to engage the engaging portion so that movement of the card tray can positively be prevented. Accordingly, owing to a provision of the abutment member, the card can positively be prevented from being inserted in its upside-down state and the user can feel the upside-down insertion of the card with the finger, so that the card is removed immediately and reinserted in its correct state.

Moreover, the intended object can be achieved by such a simple construction that one corner of a leading edge portion of the card is truncated and a lock claw is, for example, integrally formed on the card tray.

While the present invention has been described with respect to one preferred embodiment, it will be understood that the invention should not be limited to this embodiment. Various modifications may be made without departing from the spirit and scope of the invention as defined by the appended claims.

What is claimed is:

1. A card upside-down insertion preventive apparatus comprising a truncated corner portion formed at one end of a leading edge portion of a square card, a card tray disposed in a card insertion chamber communicating with a card inlet port, said card tray having a front abutment member and capable of moving in accordance with insertion of said card, the leading edge of said card being brought into abutment with said front abutment portion when said card is inserted through said card inlet port, a lock claw formed on said card tray, said lock claw being capable of displacing upwardly and downwardly in a direction perpendicular to the card insertion direction, a pressure receiving portion formed on said claw so as to cooperate with a region within said truncated corner portion of said card when the card is in abutment with said front abutment member and inserted right side up, said pressure receiving portion causing said lock claw to displace downwardly by being pressed by a non-truncated corner portion formed at the other end of said front edge portion of said card when said card is inserted upside down, and an engagement portion formed at a location corresponding to a lower surface of said card tray and adapted to engage said lock claw when said lock claw has displaced downwardly so as to prevent movement of said card tray.

2. A card upside-down insertion preventive apparatus according to claim 1, wherein said card tray is means for controlling a contact which is brought into contact with a card during the movement of said card tray in accordance with the insertion of said card.

3. A card upside-down insertion preventive apparatus according to claim 1, wherein said pressure receiving portion has a pressure receiving surface which is inclined upwardly in the card insertion direction.

* * * * *